Sept. 30, 1958   M. E. ANNICH ET AL   2,854,631
METERING SYSTEMS

Filed May 22, 1956   2 Sheets-Sheet 1

INVENTORS.
MILTON E. ANNICH
ROBERT B. McCUNE
BY
*Wallace and Cannon*
ATTORNEYS

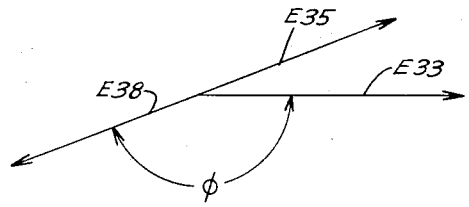
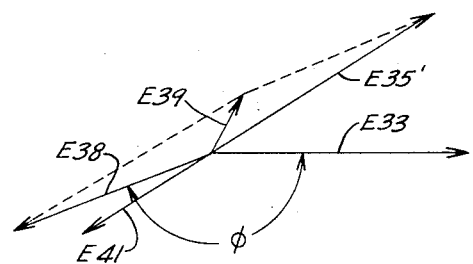
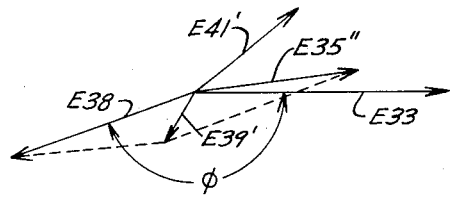
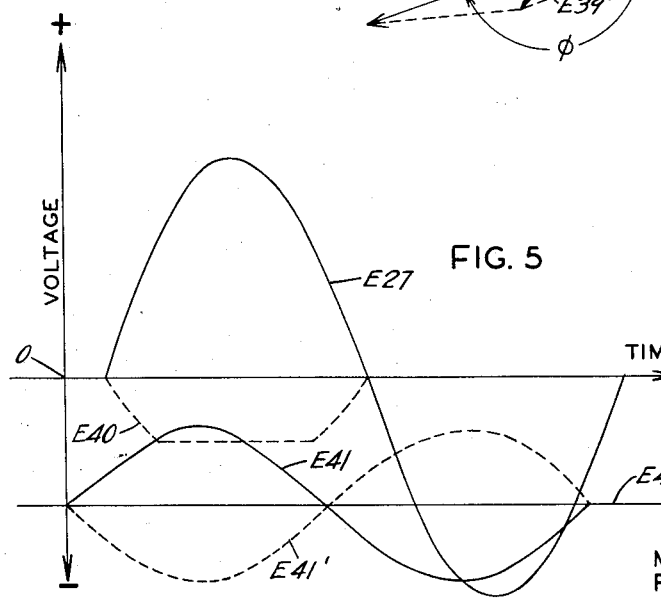

United States Patent Office 2,854,631
Patented Sept. 30, 1958

2,854,631

METERING SYSTEMS

Milton E. Annich, Suffern, N. Y., and Robert B. McCune, Allendale, N. J., assignors to American Brake Shoe Company, New York, N. Y., a corporation of Delaware Application May 22, 1956, Serial No. 586,513

11 Claims. (Cl. 324—107)

This invention relates to a new and improved metering system. More particularly, it is concerned with a metering system which is particularly useful in testing equipment energized from a three-phase power supply.

In many manufacturing processes, it is highly desirable to provide a metering system for indicating and/or recording certain information concerning materials, tools, and equipment used in a given part of the process. In a given machining operation, for example, it may be desirable to obtain information relating to the operation of such equipment as conveyor belts, cutting tools, saw blades, grinding and cut-off wheels or other abrasive equipment, and the like. This information can then be utilized to determine whether or not the machine performing the operation is functioning efficiently or is in need of cleaning lubricating, repair, or other maintenance. The same information is equally useful in determining the machining or other qualities of the materials used in the manufacturing operation and in maintaining continuous surveillance over material quality.

Two particular types of information are usually of prime importance, regardless of whether it is the manufacturing equipment or the materials which are to be tested. The energy required to carry out the machining or other manufacturing process is of primary importance in that it provides a measure of the efficiency of the equipment and/or of the physical properties of the material being processed. The time required for the manufacturing procedure is of equal importance in determining these same factors. In particular processes, of course, other specific information may be vital; for example, the quantity of material used in manufacturing a given object may be of prime importance in determining the efficiency of particular process equipment or in measuring the quality of the materials used in fabricating the desired device. Because energy consumed and time elapsed in most instances are quite important, the following specification is directed to a particular embodiment of the invention which determines these factors. It should be understood that metering equipment capable of indicating other qualities such as material consumed, temperature, and so on may be utilized where required.

In the past, test equipment capable of providing a useful and accurate check on the operation of manufacturing equipment has been relatively complex and expensive; as a consequence, it has not been economically feasible to provide such equipment for individual machines. Rather, the test equipment has been used sporadically with a number of different machines to avoid excessive cost on any individual manufacturing operation. This practice, although often quite useful, frequently leads to continued operation of a machine after its efficiency has dropped far below normal or permits use of substandard materials and may ultimately lead to substantial losses via delays in manufacturing schedules or rejects on later inspection.

It is an object of the invention, therefore, to enable a metering system to be used in conjunction with a wide variety of manufacturing processes and equipment.

Another object of the invention is a metering system which furnished accurate information concerning the energy and time consumed in a given manufacturing operation.

Yet a further object of the invention is a metering system which is relatively inexpensive in construction.

An additional object of the invention is to enable a metering system to be easily added to or incorporated in a machine or other apparatus.

The invention is directed to a metering system suitable for use in conjunction with apparatus comprising a three-phase power supply and a machine or other equipment energized from that power supply. A metering system constructed in accordance with the invention comprises means for generating a first control signal having an amplitude and phase representative of current in one phase of the power supply and means for generating a second control signal having an amplitude and phase representative of the potential across two phases of the power supply. Means are provided for combining the two control signals in predetermined phase and amplitude relationship to develop a third control signal having an amplitude and phase indicative of load conditions at the machine. The metering system further includes an electric discharge device and means for maintaining the discharge device non-conductive in the absence of an applied signal. The third control signal is applied to the discharge device to render the device conductive upon occurrence of preselected load conditions at the testing device. A metering device, usually a watthour meter and/or a timer, is included in the system; this metering device is actuated in response to conduction in the electric discharge device.

Other and further objects of the present invention will be apparent from the following description and claims and are illustrated in the accompanying drawings, which, by way of illustration, show a preferred embodiment of the present invention and the principles thereof and what is now considered to be the best mode for applying those principles. Other embodiments of the invention embodying the same or equivalent principles may be used and structural changes may be made as desired without departing from the invention and the purview of the appended claims.

In the drawings:

Figure 2 is a vector diagram illustrating signal conditions in the system of Figure 1 under given load conditions;

Figure 3 is a corresponding vector diagram indicating the effect of an increase in load;

Figure 4 is an additional vector diagram showing the effect of a decrease in load; and Figure 5 is an explanatory diagram showing the signals applied to the control tube of the metering system of Figure 1.

Figure 1:
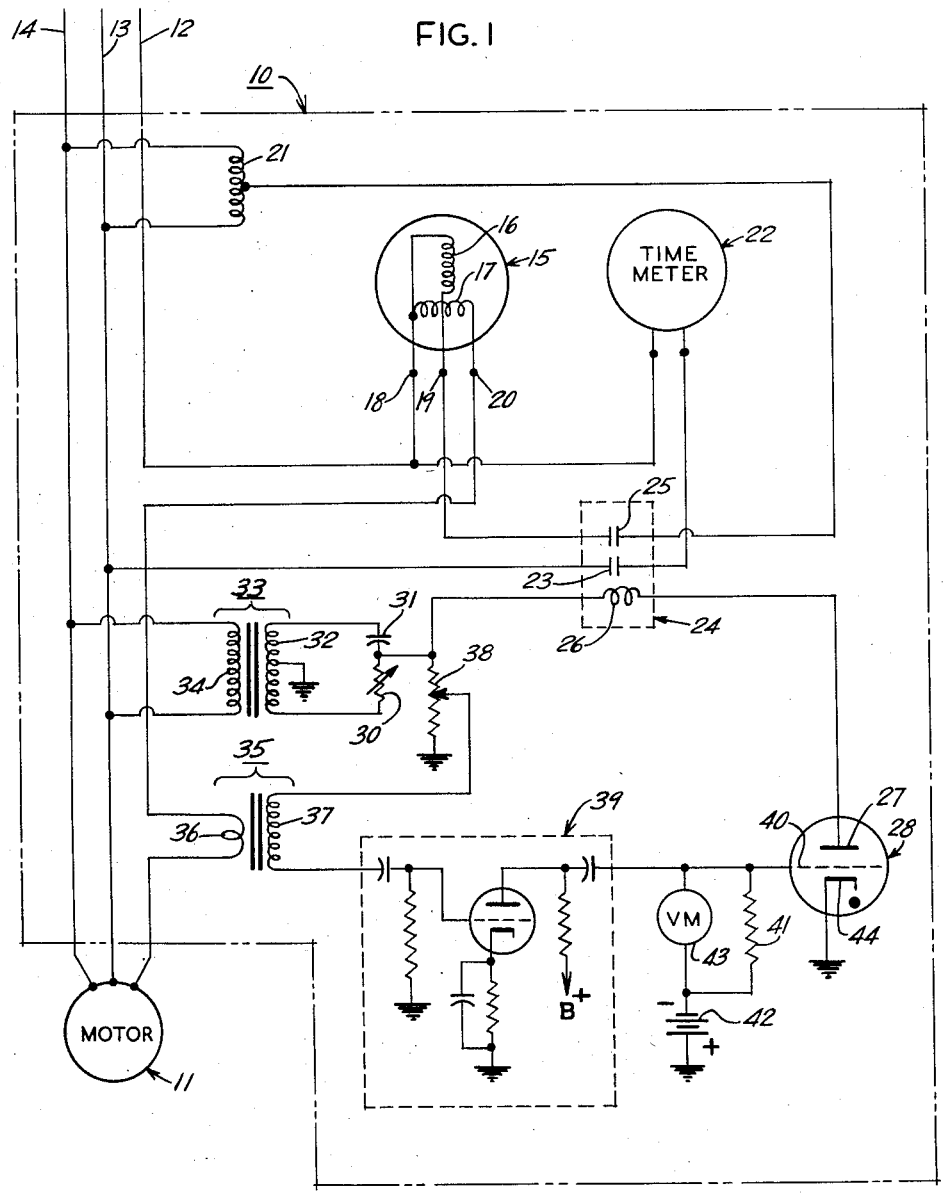
Figure 1 is a schematic diagram of metering system constructed in accordance with a preferred embodiment of the invention.

The preferred embodiment of the invention illustrated in Figure 1 comprises a metering system 10 which is utilized to determine the efficiency of a machine or other equipment generally represented by a motor 11 energized from a three-phase power supply indicated by three conductors 12, 13, and 14. As noted above, the metering system may also be employed to measure various qualities of the material being processed by the equipment. Metering system 10 includes a watthour meter 15 comprising the usual potential coil 16 and current coil 17; one end of each of the meter coils is connected to a common terminal 18, whereas the remaining ends of coils 16 and 17 are connected to two other meter terminals 19 and 20, respectively. Current coil 17 is connected in series with power supply conductor 12 by means of appropriate connections to terminals 18 and 20 of the watthour meter. Potential coil 16 is connected to power supply conductor 12 through the common terminal 18, whereas terminal 19 of the voltage coil is connected to the electrical midpoint of a reactance coil 21, the two terminals of coil 21 being connected to power supply conductors 13 and 14. With this T reactance coil connection, watthour meter 15 provides an indication of the total energy drawn from power supply 12—14; the watthour meter reading may be multipled by two to determine the total actual energy furnished to motor 11. Of course, any other standard connection for measuring three-phase power with a single-phase meter may be employed if desired, or a polyphase meter may be substituted for single-phase meter 15. Typical connections for various types of meters are illustrated in Sections 3–168 and 3–169 of "Standard Handbook for Electrical Engineers," published by McGraw-Hill Book Company, seventh edition, 1941.

Metering system 10 also includes a time meter or chronometer 22; time meter 22 may comprise any suitable electrically-actuated time recorder and is also energized from power supply 12—14. In the illustrated embodiment, the time meter is connected between phases 12 and 13 of the power supply, but any other suitable connection may be employed. The energizing circuit for chronometer 22 includes a pair of normally-open contacts 23 incorporated in a relay 24, so that the time meter is inoperative except for intervals when the relay is energized; a second pair of relay contacts 25 is interposed in the voltage-coil energizing circuit of watthour meter 15 to provide a means for controlling operation of the energy meter.

One terminal of the operating coil 26 of control relay 24 is connected to the anode 27 of an electric discharge device 28; in the illustrated system, device 28 comprises a grid-controlled ionic discharge device of the type conventionally termed a thyratron. A vacuum tube, such as a vacuum triode, may be employed for electric discharge device 28 instead of the thyratron as desired. A vacuum tube, however, has inherent marginal operating characteristics which are not especially desirable in the metering system, and a thyratron or similar device is preferred because its operating characteristics are more suitable for use in the metering system, as will be explained more fully hereinafter. The other terminal of relay coil 26 is connected to an adjustable phase shift network comprising a variable resistor 30 and a capacitor 31 connected in series with each other, coil 26 being connected to the common terminal of the resistor and capacitor. The phase shift circuit is connected across the secondary winding 32 of a transformer 33, the electrical center of winding 32 being grounded. The primary winding 34 of transformer 33 is connected across phases 13 and 14 of the power supply.

Metering system 10 also includes a current transformer 35 comprising a primary winding 36 connected in series with power supply conductor 12. The secondary winding 37 of current transformer 35 has one terminal connected to phasing network 30, 31 through a potentiometer 38. The other terminal of transformer winding 37 is coupled to an amplifier 39. Amplifier 39, in the illustrated embodiment, comprises a conventional resistance-coupled amplifier, although any other suitable low-frequency amplifier may be employed if desired. The output stage of amplifier 39 is coupled to the control electrode 40 of control tube 28 by means of an input circuit comprising an input resistor 41 having one terminal connected to the amplifier and to control electrode 40, the other terminal of resistor 41 being connected to the negative terminal of an auxiliary D. C. power supply illustrated as a battery 42. The positive terminal of battery 42 is grounded. A voltmeter 43 is connected in parallel with input resistor 41. The input circuit is completed by connecting the cathode 44 of control tube 28 to ground. Because only relative voltage amplitudes affect operation of the metering system, voltage meter 43 may be replaced by a miniature cathode ray tube of the "tuning eye" type or any other voltage-sensitive indicating device.

In operation, metering system 10 is first calibrated for selected load conditions, usually for no-load operation. For the purpose, variable resistor 30 and potentiometer 38 are adjusted to provide a zero-voltage reading on voltmeter 43 with the machine or other equipment represented by motor 11 running but not under load. Variations in the resistance value of resistor 30 serve to adjust the phase of the signal applied to amplifier 39 from potential transformer 33 to bring that signal into phase opposition to the signal supplied from current transformer 35; potentiometer 38 is adjusted to make the amplitude of the signal from the potential transformer equal to that of the signal from the current transformer. Thus, the first control signal from current transformer 35 is combined with the second control signal from potential transformer 33 by means of the circuit connecting the two transformers to develop a third control signal having approximately zero amplitude when motor 11 is operating in its no-load condition.

Whenever the equipment represented by motor 11 is loaded, as when a machining operation is started, the amplitude and phase relationships established by adjustment of resistor 30 and potentiometer 38 for no-load conditions are substantially altered, so that the third control signal is no longer of zero amplitude. The effect of load changes upon the magnitude and phase of the third control signal formed by combining the signals from transformers 33 and 35 can best be understood by reference to the explanatory diagrams of Figures 2, 3 and 4, which illustrate signal conditions for no-load operation, for an increased load on motor 11, and for a decreased load on the motor respectively.

In Figure 2, the vector E35 represents the first control signal, that derived by current transformer 35, which has an amplitude and phase representative of current flow in power supply phase 12. Vector E33 corresponds to the second control signal which is developed by potential transformer 33 and has a phase and amplitude representative of the potential across phases 13 and 14 of the power supply. This second control signal is shifted in phase through the angle in the phase-shift circuit 30, 31 and is adjusted in amplitude by potentiometer 38 to provide the signal represented by vector E38, which is combined with signal E35 in the input circuit of amplifier 39. As indicated above, the system is calibrated for no-load conditions to make the two signals E33 and E38 equal in amplitude and opposite in phase, so that the signal applied to amplifier 39 is of zero amplitude.

Figure 3 shows the signal relationships in the control portion of the metering system when the load on the equipment represented by motor 11 is increased, as when the equipment is utilized in manufacturing. Under these load conditions, the current control signal from transformer 35, represented by vector E35', increases in amplitude and in phase angle, due to the change in current drawn by motor 11 and the accompanying change in power factor. The potential control signal E33 from transformer 35, however, remains relatively unchanged so that the output signal E38 of the phase-shift network is the same as in the no-load condition (Figure 2). Consequently, the resultant of vectors E35' and E38 is not zero; the third control signal formed by combining these signals is shown in Figure 3 as vector E39, representing the input signal to amplifier 39 under load conditions. The output signal from the amplifier is shown as vector E41, representing the third control signal as it is applied to the control electrode of thyratron 28 after the amplification and phase shift introduced by amplifier 39.

A somewhat similar change in signal relationships occurs in the control portion of metering system 10 if the motor load is decreased from the calibrated no-load condition, as when a chuck, jig, or other fixture is removed from the manufacturing equipment represented by motor 11. In this instance, the current control signal is reduced in amplitude and in phase angle, as indicated by vector E35″. Again, the potential control signal E33 and the phase-shifted combining form E38 of that signal remain unchanged, producing a resultant third or combined control signal E39′ which is applied to amplifier 39 and amplified therein to produce an input signal E41′ across input resistor 41 of control tube 28. It should be noted that the signal E41′ applied to the control tube under these conditions, with the load decreased from the normal or no-load condition, is approximately opposite in phase to the signal E41 supplied to the control tube when the load is substantially increased (Figure 3).

The effect of the control signal E41 upon control tube 28 is best understood from consideration of Figure 5, in which the voltage applied to anode 27 through the circuit comprising transformer 33, phase shift circuit 30, 31, and relay coil 26 is illustrated by curve E27. The critical voltage for firing the thyratron is illustrated by the dash line E40, which indicates the grid potential necessarge to initiate conduction in the control tube. The line E42 shows the negative bias applied to control grid 40 from battery 42; it is also representative of the control grid voltage when the motor 11 is operating under normal no-load conditions, since the signal output from amplifier 39 is then zero. The curve E41 corresponds to vector E41 of Figure 3 and is approximately in phase with anode voltage E27, so that thyratron 28 fires on each positive half cycle whenever the amplitude of signal E41 exceeds critical grid potential E40. The dash-line curve E41′ on the other hand, corresponds to the third or combined control signal applied to the control tube grid 40 when the load on motor 11 is decreased from the normal calibrated value (see vector E41′ in Figure 4) and cannot fire tube 28 because of the phase relationship with respect to anode voltage E27.

When the load upon motor 11, Figure 1, is increased sufficiently to fire thyratron 27, as described in connection with Figures 2–5, relay coil 26 is energized by virtue of its connection in the anode circuit of the control tube, thereby closing meter circuit contacts 23 and 25. Consequently, watthour meter 15 and time meter 22 are connected to power supply 12—14 to record the energy consumed and time required for the particular machining or other operation performed by the equipment powered by motor 11. As soon as the load drops sufficiently to reduce output voltage E41 from amplifier 39 below critical firing level E40 of tube 28 or to cause a phase displacement which shifts output voltage E41 outside critical firing range E40 (see Fig. 5), the control tube returns to its normal non-conductive state, current flow through coil 26 is interrupted, and metering contacts 23 and 25 open, so that the metering system records only the power and time required for the particular manufacturing operation and does not require correction for periods of no-load operation. As noted above, the metering system cannot be actuated by a decrease in load at motor 11 from the calibrated load condition, due to the change in phase of the third or combined control signal produced under these conditions.

Thyratron 28 is preferable to a vacuum tube in the described system, since it functions essentially as an on-off switch, the current drawn by the thyratron being essentially independent of grid voltage once the critical grid voltage has exeen exceeded. Thus, the amplitude of the current through relay coil 26 is not proportional to the amplitude of the signal voltage applied to the control tube grid and the relay may be made to operate whenever the load increase is sufficient to fire thyratron 28. Of course, a vacuum tube may be utilized instead of thyratron 28 in applications where it is certain that on any given manufacturing operation the load increase will be of sufficient magnitude to establish a current through coil 26 great enough to close the relay contacts.

Metering system 10 is relatively simple and markedly economical in construction as compared with comparable prior art apparatus. It may be used in conjunction with any equipment energized from a three-phase power supply, particularly where the equipment provides a relatively balanced load upon the power supply and may be easily connected into the power supply for the manufacturing apparatus. The utilization of two initial control signals, one indicative of voltage conditions in the power supply and the other representative of power supply current, makes it possible to obtain high sensitivity to very small load changes, an especially important factor in testing equipment in which the power required under load conditions is not extremely large as compared with no-load operation. In this connection, it may be noted that the system may be calibrated to record or indicate changes from any given load condition, and is not limited to measurement of variations from no-load operation.

While a preferred embodiment of the invention has been illustrated and described, it is to be understood that this embodiment is capable of variation and modification, and we therefore do not wish to be limited to the precise details set forth, but desire to avail ourselves of such changes and alterations as fall within the purview of the following claims.

We claim:

1. A metering system for equipment comprising a three-phase power supply and an electrical apparatus energized from said power supply, said metering system comprising: means for generating a first control signal having an amplitude and phase representative of current in one phase of said power supply; means for generating a second control signal having an amplitude and phase directly representative of the potential across two phases of said power supply; means for combining said two control signals in predetermined phase and amplitude relationship to develop a third control signal having an amplitude and phase indicative of load conditions at said apparatus; an electric discharge device; means for maintaining said discharge device non-conductive in the absence of an applied signal; means for applying said third control signal to said electric discharge device in conjunction with one of said first and second control signals to render said device conductive upon occurrence of a given phase and amplitude relation between the control signals applied to said discharge device indicative of preselected load conditions at said apparatus; a metering device; and means for actuating said metering device in response to conduction in said electric discharge device.

2. A metering system for equipment comprising a three-phase power supply and an electrical apparatus energized from said power supply, said metering system comprising: means for generating a first control signal having an amplitude and phase representative of current in one phase of said power supply; means for generating a second control signal having an amplitude and a phase directly representative of the potential across the remaining two phases of said power supply; means for combining said two control signals in predetermined phase and amplitude relationship to develop a third control signal having an amplitude and phase indicative of load conditions at said apparatus, the amplitude of said third control signal being approximately equal to zero for a preselected normal load condition at said apparatus; an electric discharge device; means for maintaining said discharge device non-conductive in the absence of an applied signal; means for applying said third control signal to said electric discharge device in conjunction with one of said first and second control signals to render said device conductive upon occurrence of a given phase and amplitude relation between the control signals applied to said discharge device indicative of a predetermined variation from said normal load condition at said apparatus; a metering device; and means for actuating said metering device in response to conduction in said electric discharge device.

3. A metering system for equipment comprising a three-phase power supply and a three-phase motor energized from said power supply, said metering system comprising: means for generating a first control signal having an amplitude and phase representative of current in one phase of said power supply; means for generating a second control signal having an amplitude and phase directly representative of the potential across two phases of said power supply; means for combining said two control signals in predetermined phase and amplitude relationship to develop a third control signal having an amplitude and phase indicative of load conditions at said motor, the amplitude of said third control signal being approximately equal to zero when said motor is operating without load; an electric discharge device; means for maintaining said discharge device non-conductive in the absence of an applied signal; means for applying said second and third control signals to said electric discharge device to render said device conductive only when said motor is operating under load; a metering device; and means for actuating said metering device in response to conduction in said electric discharge device.

4. A metering system for equipment comprising a three-phase power supply and an electrical apparatus energized from said power supply, said metering system comprising: a current transformer connected in one phase of said power supply for generating a first control signal having an amplitude and phase representative of current in said one phase of said power supply; a potential transformer connected across two phases of said power supply for generating a second control signal having an amplitude and phase directly representative of the potential across said two phases of said power supply; means for combining said two control signals in predetermined phase and amplitude relationship to develop a third control signal having an amplitude and phase indicative of load conditions at said apparatus; an electric discharge device; means for maintaining said discharge device non-conductive in the absence of an applied signal; means for applying said third control signal to said electric discharge device in conjunction with one of said first and second control signals to render said device conductive upon occurrence of a given phase and amplitude relation between the control signals applied to said discharge device indicative of preselected load conditions at said apparatus; a metering device; and means for actuating said metering device in response to conduction in said electric discharge device.

5. A metering system for equipment comprising a three-phase power supply and an electrical apparatus energized from said power supply, said metering system comprising: means for generating a first control signal having an amplitude and phase representative of current in one phase of said power supply; means for generating a second control signal having an amplitude and phase directly representative of the potential across two phases of said power supply; means for combining said two control signals in predetermined phase and amplitude relationship to develop a third control signal having an amplitude and phase indicative of load conditions at said apparatus, said combining means including an adjustable phase-shift circuit, coupled to said means for generating said second control signal, for establishing said second control signal at a phase angle of 180° with respect to said first control signal upon occurrence of predetermined load conditions at said apparatus; an electric discharge device; means for maintaining said discharge device non-conductive in the absence of an applied signal; means for applying said second and third control signals to said electric discharge device to render said device conductive upon occurrence of a given phase and amplitude relation between the control signals applied to said discharge device indicative of preselected load conditions at said apparatus; a metering device; and means for actuating said metering device in response to conduction in said electric discharge device.

6. A metering system for equipment comprising a three-phase power supply and an electrical apparatus energized from said power supply, said metering system comprising: means for generating a first control signal having an amplitude and phase representative of current in one phase of said power supply; means for generating a second control signal having an amplitude and phase directly representative of the potential across the remaining two phases of said power supply; means for combining said two control signals in predetermined phase and amplitude relationship to develop a third control signal having an amplitude and phase indicative of load conditions at said apparatus, the amplitude of said third control signal being approximately equal to zero for a preselected normal load condition at said apparatus; an electric discharge device; means for maintaining said discharge device non-conductive in the absence of an applied signal; means for applying said third control signal to said electric discharge device in conjunction with said second control signal to render said device conductive upon occurrence of a given phase and amplitude relation between the control signals applied to said discharge device indicative of a predetermined variation from said normal load condition at said apparatus; a voltmeter connected in the input circuit of said electron discharge device to provide a positive indication of operation of said apparatus at said normal load condition; a metering device; and means for actuating said metering device in response to conduction in said electric discharge device.

7. A metering system for equipment comprising a three-phase power supply and an electrical apparatus energized from said power supply, said metering system comprising: means for generating a first control signal having an amplitude and phase representative of current in one phase of said power supply; means for generating a second control signal having an amplitude and phase directly representative of the potential across two phases of said power supply; means for combining said two control signals in predetermined phase and amplitude relationship to develop a third control signal having an amplitude and phase indicative of load conditions at said apparatus; an electric discharge device; means for maintaining said discharge device non-conductive in the absence of an applied signal; means for applying said third control signal to said electric discharge device in conjunction with one of said first and second control signals to render said device conductive upon occurrence of a given phase and amplitude relation between the control signals applied to said discharge device indicative of preselected load conditions at said apparatus; a relay having its operating coil connected in series with the discharge path in said electric discharge device and having a pair of normally-open contacts which are closed whenever said discharge device is rendered conductive; and a metering device connected to an energizing circuit through said relay contacts to be actuated in response to conduction in said electric discharge device.

8. A metering system for equipment comprising a three-phase power supply and an electrical apparatus energized from said power supply, said metering system comprising: means for generating a first control signal having an amplitude and phase representative of current in one phase of said power supply; means for generating a second control signal having an amplitude and phase directly representative of the potential across two phases of said power supply; means for combining said two control signals in predetermined phase and amplitude relationship to develop a third control signal having an amplitude and phase indicative of load conditions at said apparatus; an electric discharge device including an anode, a control electrode, and a cathode; means for maintaining said discharge device non-conductive in the absence of an applied signal on said control electrode; means for applying said second control signal to said anode of said electric discharge device; means for applying said third control signal to said control electrode of said discharge device in predetermined phase relationship with said second control signal to render said device conductive only upon occurrence of a given phase and amplitude relation between the control signals applied to said discharge device indicative of preselected load conditions at said apparatus; a metering device; and means for actuating said metering device in response to conduction in said electric discharge device.

9. A metering system for equipment comprising a three-phase power supply and an electrical apparatus energized from said power supply, said metering system comprising: means for generating a first control signal having an amplitude and phase representative of current in one phase of said power supply; means for generating a second control signal having an amplitude and phase directly representative of the potential across two phases of said power supply; means for combining said two control signals in predetermined phase and amplitude relationship to develop a third control signal having an amplitude and phase indicative of load conditions at said apparatus; an electric discharge device of the grid-controlled ionic rectifier type comprising an anode, a control electrode, and a cathode; means for maintaining said discharge device non-conductive in the absence of an applied signal on said control electrode; means for applying said second control signal to said anode of said electric discharge device; means for applying said third control signal to said control electrode of said discharge device in predetermined phase relationship with said second control signal to render said device conductive only upon occurrence of a given phase and amplitude relation between the control signals applied to said discharge device indicative of preselected load conditions at said apparatus; a metering device; and means for actuating said metering device in response to conduction in said electric discharge device.

10. A metering system for equipment comprising a three-phase power supply and an electrical apparatus energized from said power supply, said metering system comprising: means for generating a first control signal having an amplitude and phase representative of current in one phase of said power supply; means for generating a second control signal having an amplitude and phase directly representative of the potential across two phases of said power supply; means for combining said two control signals in predetermined phase and amplitude relationship to develop a third control signal having an amplitude and phase indicative of load conditions at said apparatus; an electric discharge device; means for maintaining said discharge device non-conductive in the absence of an applied signal; means for applying said third control signal to said electric discharge device in conjunction with one of said first and second control signals to render said device conductive upon occurrence of a given phase and amplitude relation between the control signals applied to said discharge device indicative of preselected load conditions at said apparatus; an energy-metering device coupled to said power supply; and means for actuating said metering device in response to conduction in said electric discharge device.

11. A metering system for equipment comprising a three-phase power supply and an electrical apparatus energized from said power supply, said metering system comprising: means for generating a first control signal having an amplitude and phase representative of current in one phase of said power supply; means for generating a second control signal having an amplitude and phase directly representative of the potential across two phases of said power supply; means for combining said two control signals in predetermined phase and amplitude relationship to develop a third control signal having an amplitude and phase indicative of load conditions at said apparatus; an electric discharge device; means for maintaining said discharge device non-conductive in the absence of an applied signal; means for applying said third control signal to said electric discharge device in conjunction with one of said first and second control signals to render said device conductive upon occurrence of a given phase and amplitude relation between the control signals applied to said discharge device indicative of preselected load conditions at said testing device; a recording chronometer; and means for actuating said chronometer in response to conduction in said electric discharge device.

References Cited in the file of this patent

UNITED STATES PATENTS

| | | |
|---|---|---|
| 2,027,214 | Wideroe | Jan. 7, 1936 |
| 2,511,680 | Warrington | June 13, 1950 |
| 2,605,304 | Proctor | July 29, 1952 |
| 2,700,134 | Stewart | Jan. 18, 1955 |